(12) United States Patent
Korszeniewski

(10) Patent No.: US 12,349,628 B2
(45) Date of Patent: Jul. 8, 2025

(54) MOTORIZED LUTE

(71) Applicant: PowerLute LLC, Wellington, FL (US)

(72) Inventor: Robert Korszeniewski, Wellington, FL (US)

(73) Assignee: PowerLute LLC, Palm Beach Gardens, FL (US)

( * ) Notice: Subject to any disclaimer, the term of this patent is extended or adjusted under 35 U.S.C. 154(b) by 72 days.

(21) Appl. No.: 18/349,757

(22) Filed: Jul. 10, 2023

(65) Prior Publication Data

US 2024/0130272 A1 Apr. 25, 2024
US 2024/0224844 A9 Jul. 11, 2024

Related U.S. Application Data

(60) Provisional application No. 63/418,213, filed on Oct. 21, 2022.

(51) Int. Cl.
*A01D 7/00* (2006.01)
*A01D 7/06* (2006.01)
*A01D 7/10* (2006.01)

(52) U.S. Cl.
CPC .................................. *A01D 7/06* (2013.01)

(58) Field of Classification Search
CPC .......... A01B 31/00; A01D 7/06; A01D 11/06; A01D 34/02; A01D 34/90; A01D 34/14; A01D 34/22; A01D 34/46
See application file for complete search history.

(56) References Cited

U.S. PATENT DOCUMENTS

| 1,489,658 | A | * | 4/1924 | Campbell | A01D 34/135 |
| | | | | | 30/216 |
| 1,902,114 | A | | 3/1933 | Beanblossom | |
| 1,919,516 | A | * | 7/1933 | Koch | A01G 3/053 |
| | | | | | 30/221 |
| 2,458,200 | A | * | 1/1949 | Renfroe | A01D 34/37 |
| | | | | | 56/17.6 |
| 2,859,676 | A | | 11/1958 | Pottol | |
| 3,851,388 | A | * | 12/1974 | Weber | A01G 3/067 |
| | | | | | 30/223 |
| 3,958,331 | A | | 5/1976 | Klebe, Jr. | |
| 3,973,378 | A | * | 8/1976 | Bartasevich | A01D 34/305 |
| | | | | | 56/246 |
| 4,075,760 | A | * | 2/1978 | Germain | A01G 3/067 |
| | | | | | 30/220 |
| 4,519,191 | A | * | 5/1985 | Ledebuhr | A01D 46/00 |
| | | | | | 56/331 |
| 4,648,464 | A | * | 3/1987 | Huxley | A01B 1/065 |
| | | | | | 30/228 |

(Continued)

*Primary Examiner* — Joseph M Rocca
*Assistant Examiner* — Robert E Pezzuto
(74) *Attorney, Agent, or Firm* — CP LAW GROUP PC; Cy Bates

(57) ABSTRACT

A motorized lute includes a first plate having a first plurality of teeth and a second plate having a second plurality of teeth. The second plate is slidably coupled to the first plate. A motor assembly is configured to engage the second plate provide a lateral force to the second plate and cause horizontal oscillation of said second plate. Wheels are disposed on each side of the first and second plate. A lute pole is coupled to the first plate and includes a primary handle and actuator for controlling speed and power of the motor.

19 Claims, 8 Drawing Sheets

(56) References Cited

U.S. PATENT DOCUMENTS

| | | | | |
|---|---|---|---|---|
| 5,431,001 | A * | 7/1995 | Lange | A01D 11/06 56/400.21 |
| 5,699,863 | A * | 12/1997 | Figura | A01B 49/02 172/197 |
| 6,052,982 | A * | 4/2000 | Haar | A01D 7/06 56/400.21 |
| 6,739,404 | B2 * | 5/2004 | Keigley | E02F 3/8157 172/684.5 |
| 7,406,770 | B2 * | 8/2008 | Mace | A01D 34/14 83/837 |
| 7,478,682 | B1 * | 1/2009 | Keigley | A01B 35/04 172/684.5 |
| 10,039,222 | B1 * | 8/2018 | Keigley | E02F 3/7663 |
| 10,287,744 | B1 * | 5/2019 | Keigley | E02F 3/841 |
| 10,287,745 | B1 * | 5/2019 | Keigley | E02F 3/8157 |
| 10,499,563 | B1 * | 12/2019 | Metcalf | A63C 19/02 |
| 10,501,912 | B2 * | 12/2019 | Keigley | E02F 3/7677 |
| 12,041,873 | B2 * | 7/2024 | Min | A01D 34/035 |
| 2006/0236671 | A1 | 10/2006 | Summerville | |
| 2023/0101418 | A1 * | 3/2023 | Oishi | A01D 34/40 56/17.6 |

\* cited by examiner

MOTORIZED LUTE

CROSS-REFERENCE TO RELATED APPLICATIONS

This application claims benefit of priority with U.S. Provisional Application Ser. No. 63/418,213, filed Oct. 21, 2022; the entire contents of which are hereby incorporated by reference.

BACKGROUND

Field of the Invention

This disclosure relates to an outdoor tool, and more particularly to a motorized lute to more efficiently grade and level ground surfaces.

Description of the Related Art

Lutes are a common tool used in the outdoors to provide grading and leveling of a ground surface. Lutes are often utilized in baseball and tennis courts during a game to ensure the playing field maintains a flat surface after agitation from players. Lutes can also provide topdressing where a top layer of sand or sand plus an organic are spread over a turf surface. Some lutes come in a rake form where a person has to manually pull the lute across the ground surface while walking backwards. Other lutes include an elongated platform that is dragged across the ground by two or more people while pulling a rope on either end of the elongated platform. Current solutions for grading and leveling are manually intensive and can take too long to complete.

There exists a need for an efficient grading and leveling tool.

SUMMARY

A motorized lute is disclosed, the motorized lute comprises a first plate having a first plurality of teeth and a second plate having a second plurality of teeth. The second plate is slidably coupled to the first plate. A motor is configured to provide a lateral force on the second plate and thereby causing horizontal oscillation of said second plate. Wheels are disposed on each side of the first and second plate. A lute pole extends from the motor and includes a primary handle and actuator for controlling speed and power of the motor.

The motorized lute can be used in landscaping and construction industries where leveling and grading are desired. The motorized lute is more efficient and faster than conventional tools and can help maintain a flat ground surface while preventing buildup of substances such as algae and calcium.

BRIEF DESCRIPTION OF THE DRAWINGS

Other features, combinations, and embodiments will be appreciated by one having the ordinary level of skill in the art and accessories upon a thorough review of the following details and descriptions, particularly when reviewed in conjunction with the drawings, wherein.

DETAILED DESCRIPTION

Figure 1:
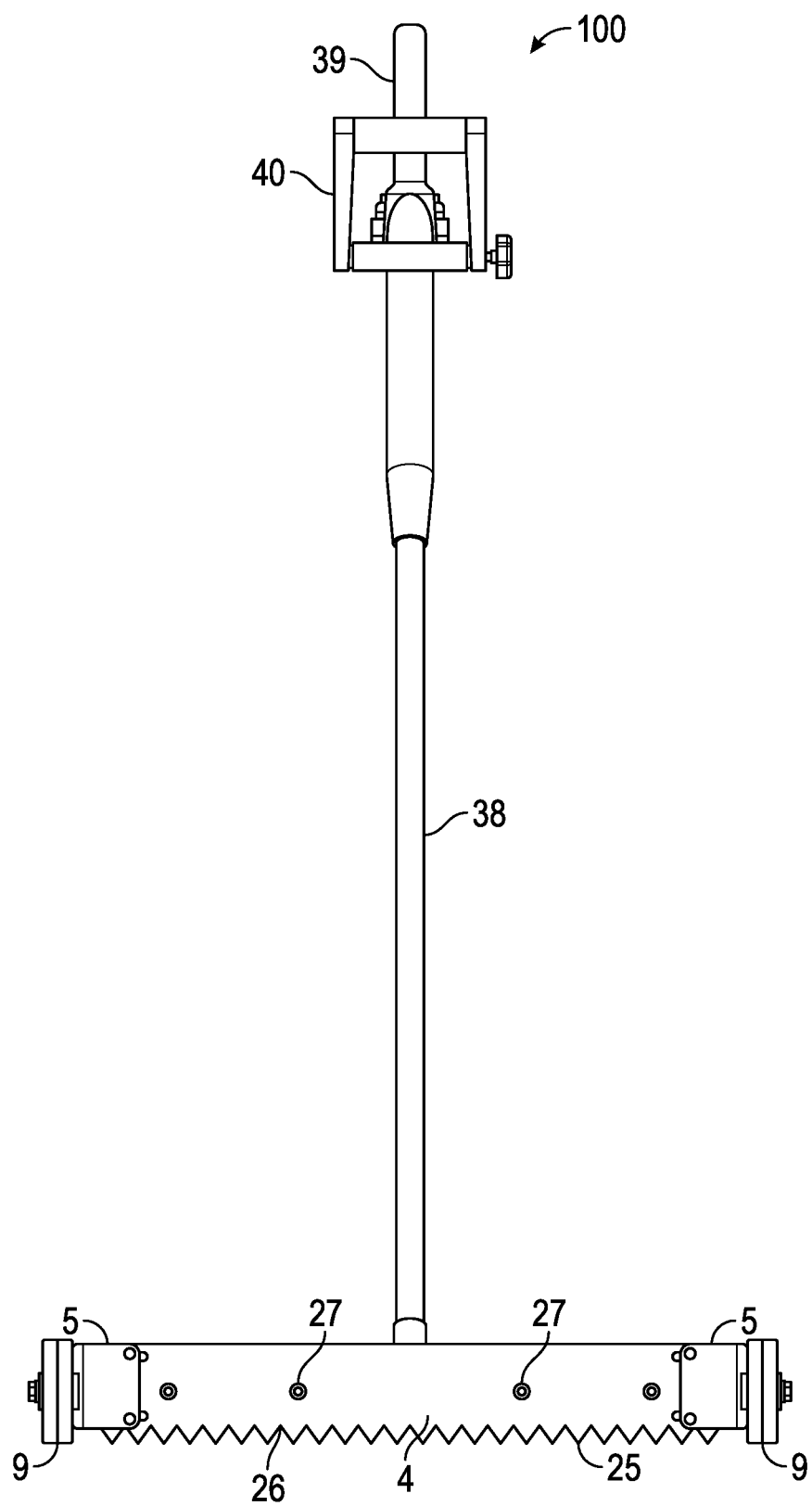
FIG. 1 shows a front view of the motorized lute in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

General Description of Embodiments

In one general embodiment, a motorized lute is disclosed. The motorized lute comprises a first plate having a first plurality of teeth, the first plate further comprising a first plate aperture and a plurality of slots disposed on each side of the first plate aperture, the first plate aperture having a first aperture diameter, a first wheel bracket and a second wheel bracket each coupled to the first plate, a plurality of wheels coupled to first wheel bracket and the second wheel bracket, a second plate slidably coupled to the first plate, the second plate having a second plurality of teeth and an oblong opening overlapping the first plate aperture, the oblong opening includes an opening width extending between the plurality of wheels and an opening height extending away from the second plurality of teeth, one or more ball bearings engaged with the plurality of slots of the first plate, a motor housing coupled to the first plate and disposed between the first wheel bracket and the second wheel bracket, a motor assembly disposed within the motor housing, the motor assembly comprising a driver gear having a driver gear diameter, and an output shaft coupled to the driver gear, the output shaft comprising an output shaft diameter, wherein the output shaft extends through the first plate aperture and engages with at least a portion of the oblong opening, thereby causing horizontal oscillation of the second plate, and a lute pole extending from the motor housing, the lute pole including a primary handle and an actuator for controlling the motor.

In some embodiments, wherein the motor assembly may cause the second plate to oscillate between the plurality of wheels.

In some embodiments, the drive gear diameter may be more than twice the output shaft diameter to accommodate a central shaft of the driver gear.

In some embodiments, the first aperture diameter may be greater than the driver gear diameter.

In some embodiments, the opening height may be equal to or greater than the drive gear diameter.

In some embodiments, the actuator may be configured to control power of the motor, speed of the motor, or both.

In some embodiments, the lute pole may further comprise an assist handle wherein the assist handle is positioned orthogonally to the primary handle.

In some embodiments, the second plate may comprise a width smaller than a width of the first plate to provide sufficient space for lateral oscillation of the second plate.

In some embodiments, the oblong opening may further comprise an extended perimeter surrounding the oblong opening.

In some embodiments, the opening height may be greater than the opening width.

In some embodiments, the opening height is greater than twice the opening width.

In some embodiments, the motorized lute may further comprise a gap disposed between the first plate and the second plate.

In some embodiments, the first plate may further comprise a side bracket coupled to each end of the first plate.

In some embodiments, each of the side brackets may further comprise a first shim and a second shim, the first shim disposed between the first plate and the second plate, and the second shim disposed between the second plate and an inner facing of the side bracket.

In some embodiments, the first plate may be disposed between the motor housing and the second plate.

In another general embodiment, a motorized lute is disclosed. The motorized lute comprises a first plate having a first plurality of teeth, a second plate slidably coupled to the first plate, the second plate having a second plurality of teeth, a motor assembly configured to engage with the second plate and cause horizontal oscillation of the second plate, a plurality of wheels coupled to the first plate, and a lute pole coupled to the first plate, the lute pole including a primary handle and an actuator for controlling the motor.

In some embodiments, the actuator may be configured to control power of the motor, speed of the motor, or both.

In some embodiments, the lute pole may further comprise an assist handle wherein the assist handle is positioned orthogonally to the primary handle.

In some embodiments, the motor assembly may cause the second plate to oscillate between the plurality of wheels.

In some embodiments, the motorized lute may further comprise a first wheel bracket and a second wheel bracket each coupled to the first plate, wherein the plurality of wheels is coupled to the first wheel bracket and the second wheel bracket.

In some embodiments, the motorized lute may further comprise a motor housing encapsulating the motor assembly, the motor housing being disposed between the first wheel bracket and the second wheel bracket.

In some embodiment, the motorized lute may further comprise a motor housing encapsulating the motor assembly, wherein the motor housing is coupled to the first plate.

In some embodiments, the second plate may comprise a width smaller than a width of the first plate to provide sufficient space for lateral oscillation of the second plate.

In some embodiments, the motor assembly may further comprise a driver gear having a driver gear diameter, and an output shaft coupled to the driver gear, the output shaft comprising an output shaft diameter.

In some embodiments, the first plate may further comprise a first plate aperture, the first plate aperture comprising a first aperture diameter.

In some embodiments, the second plate may further comprise an oblong opening having an opening width extending between the plurality of wheels and an opening height extending away from the second plurality of teeth.

In some embodiments, the oblong opening may further comprise an extended perimeter surrounding the oblong opening.

In some embodiments, the opening height may be greater than the opening width.

In some embodiments, the opening height may be greater than twice the opening width.

In some embodiments, the first plate may further comprise a plurality of slots.

In some embodiments, the first plate may further comprise one or more ball bearings engaged with the plurality of slots.

In some embodiments, the motorized lute may further comprise a gap disposed between the first plate and the second plate.

In some embodiments, the first plate may further comprise a side bracket coupled to each end of the first plate.

In some embodiments, each of the side brackets may further comprise a first shim and a second shim, the first shim disposed between the first plate and the second plate, and the second shim disposed between the second plate and an inner facing of the side bracket.

In some embodiments, the first plate may be disposed between the motor assembly and the second plate.

First Illustrated Embodiment

Now turning to the drawings, FIG. 1 shows a front view of the motorized lute (100) in accordance with a first illustrated embodiment. The motorized lute comprises a second plate (4) slidably coupled to a first plate (not shown) by a plurality of fasteners (27) and side brackets (5). The second plate comprises a second plurality of teeth (25) disposed at a second bottom side (26) of the second plate. A wheel (9) is disposed at each side of the second plate to assist in pushing the motorized lute. A lute pole (38) extends from a motor housing (not shown). At an end of the lute pole is a primary handle (39) and an assist handle (40) to allow the motorized to be pushed, pulled, and/or lifted. The second plate is configured to move laterally towards each of the wheels with aid of a motor assembly disposed within the motor housing. Side-to-side movement of the second plurality of teeth provides a faster and more efficient process for grading and leveling of ground surfaces.

Figure 2:
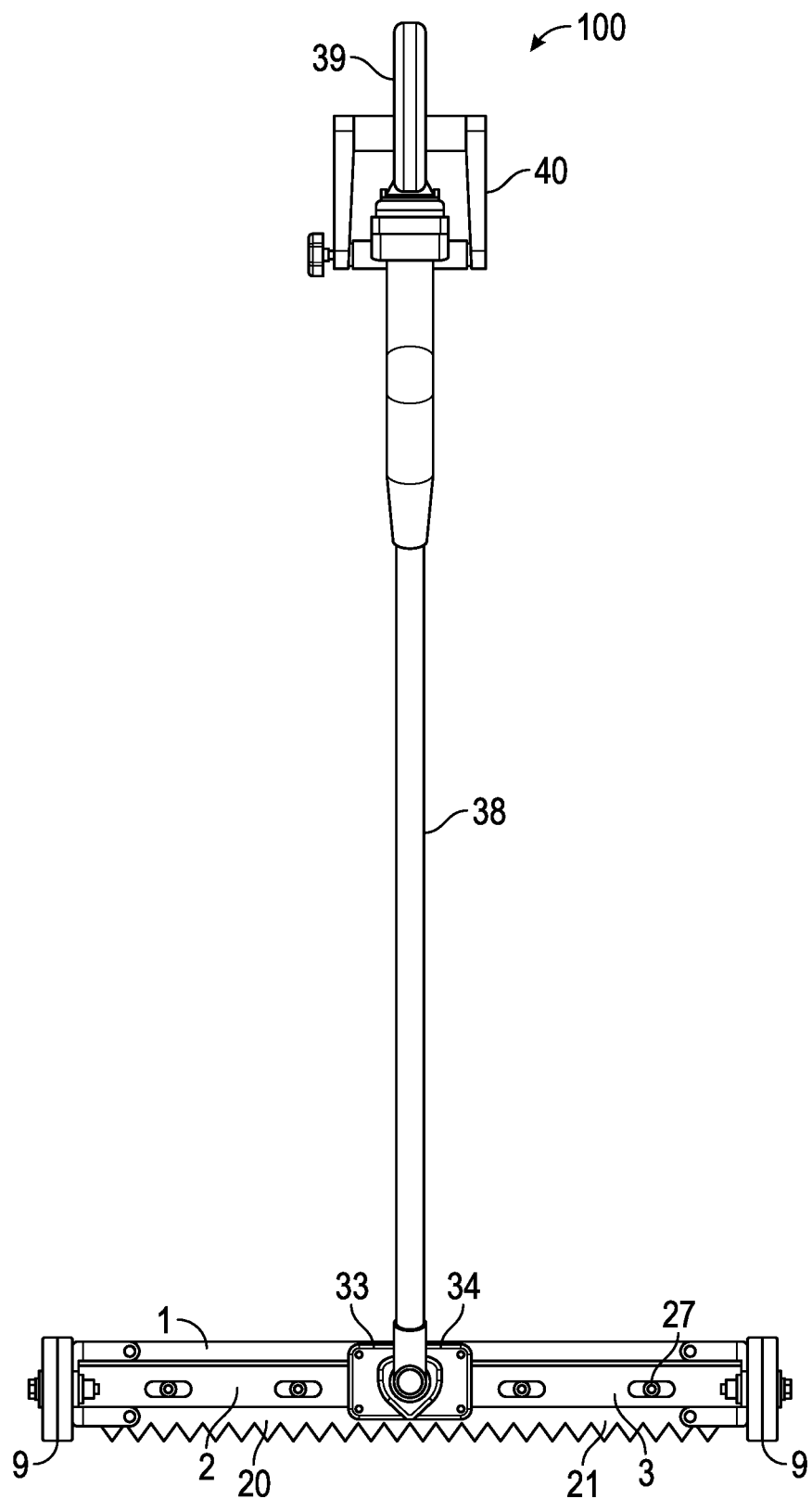
FIG. 2 shows a rear view of the motorized lute according to the first illustrated embodiment.

FIG. 2 shows a rear view of the motorized lute (100). The motorized lute comprises a first plate (1) coupled to a second plate (FIG. 1, 4). The first plate includes a first plurality of teeth (20) disposed at a first bottom side (21) of the first plate. A first wheel bracket (2) and a second wheel bracket (3) are each coupled to the first plate on a side opposite the second plate. A wheel (9) is coupled to each of the first wheel bracket and the second wheel bracket. Disposed between the first wheel bracket and the second wheel bracket and coupled to the first plate is a motor housing (34) comprising a motor assembly (33) disposed therein. The motor assembly is configured to engage with and laterally translate the second plate having a second plurality of teeth (FIG. 1, 25). Said lateral movement causes the second plurality of teeth to continually change positions with respect to the first plurality of teeth. A lute pole (38) is coupled to and extends from the motor housing. A user controls the motorized lute by grasping onto a primary handle (39) and an assist handle (40).

Figure 3:
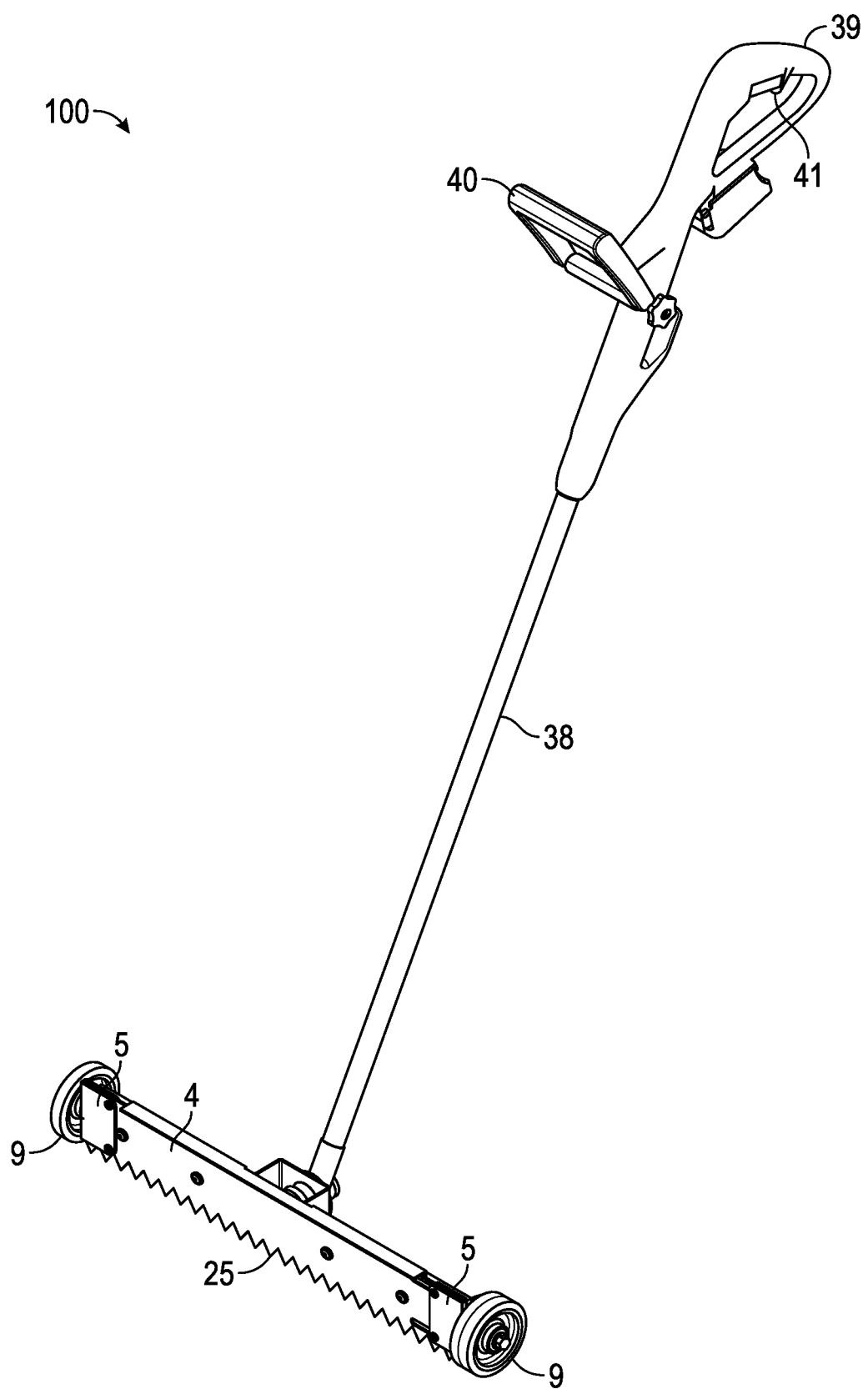
FIG. 3 shows a perspective view of the motorized lute according to the first illustrated embodiment.

FIG. 3 shows a perspective view of the motorized lute (100). The motorized lute comprises a lute pole (38) having a primary handle (39) coupled on one end. An actuator (41) is disposed near the primary handle and is configured to provide electronic control of speed and power of a motor assembly (FIG. 2, 33). The actuator may comprise any of a myriad type of actuators including button, switch, or dial. An assist handle (40) is disposed near the primary handle to provide additional control of the motorized lute. A second plate (4) is positioned near an opposite end of the pole lute with a wheel (9) positioned at each side of the second plate. In some embodiments, the wheels are adjustable to raise and/or lower the second plate from a ground surface. The second plate comprises a second plurality of teeth (25) wherein the second plate is configured to oscillate back and forth in a lateral direction. Movement of the second plurality of teeth creates a more efficient process of grading and leveling the ground surface. A side bracket (5) is coupled to the second plate on either end.

Figure 4:
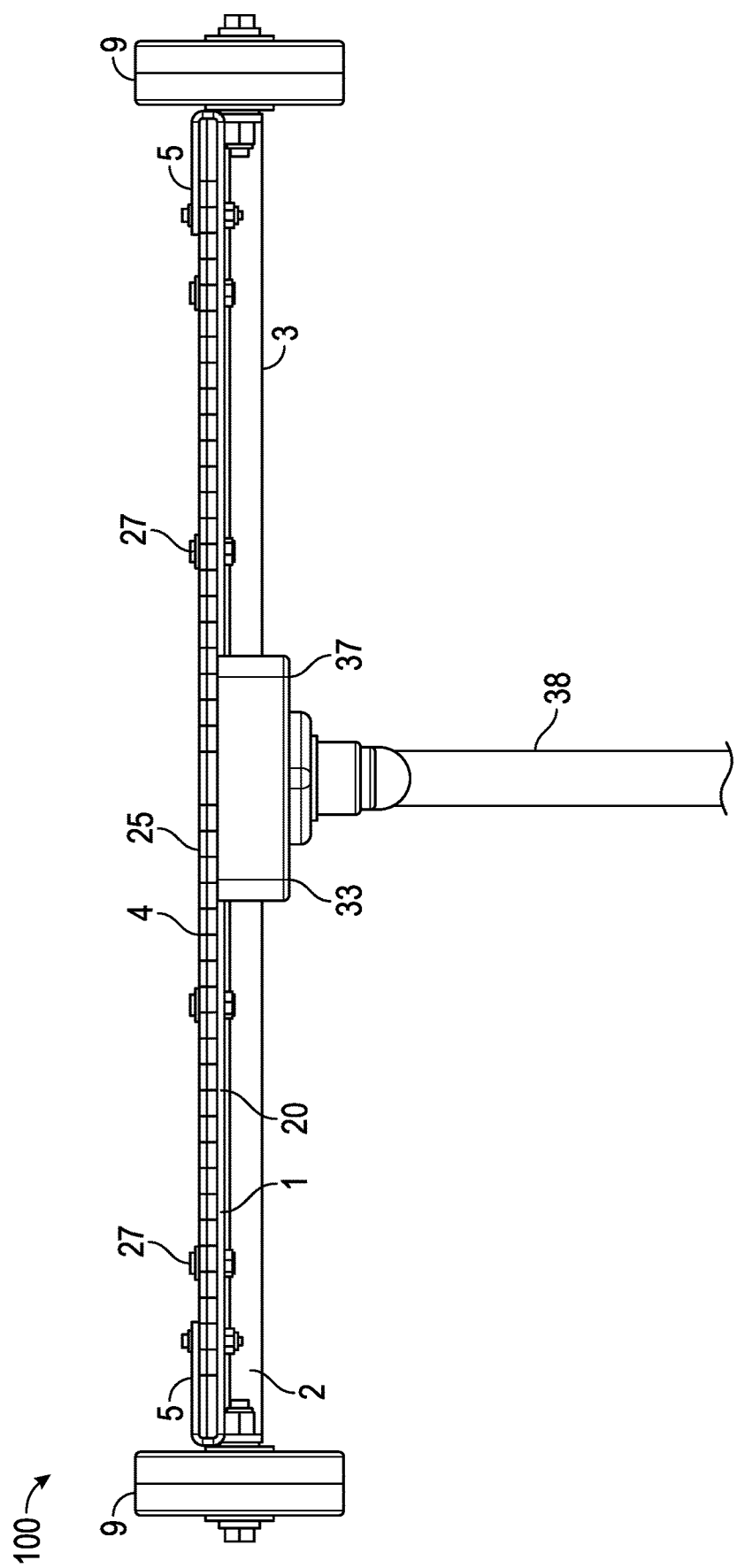
FIG. 4 shows a bottom view of the motorized lute according to the first illustrated embodiment.

FIG. 4 shows a bottom view of the motorized lute (100). A second plate (4) is slidably coupled to a first plate (1) via a plurality of fasteners (27) in addition to a side bracket (5) positioned on each end of both the first and second plate. The first and second plate comprise a first plurality of teeth (20) and a second plurality of teeth (25), respectively. The first plate, and subsequently the first plurality of teeth, can be characterized as being static due to the first plate being coupled to a first wheel bracket (2), a second wheel bracket (3), and a motor assembly disposed between the first wheel bracket and the second wheel bracket. A wheel (9) is coupled to each of the first wheel bracket and the second wheel bracket. The motor assembly is encapsulated by a motor housing (34), the motor housing having a lute pole (38) extending therefrom. The motor assembly is configured to oscillate the second plate and the second plurality of teeth.

In some embodiments, the second plate (4) has a smaller width than the first plate (1) to ensure there is sufficient space available for the second plate to oscillate laterally. In other embodiments, the second plate and first plate are similar in width and a gap is provided in the side brackets (5) to provide the sufficient space needed for the second plate to oscillate laterally.

Figure 5:
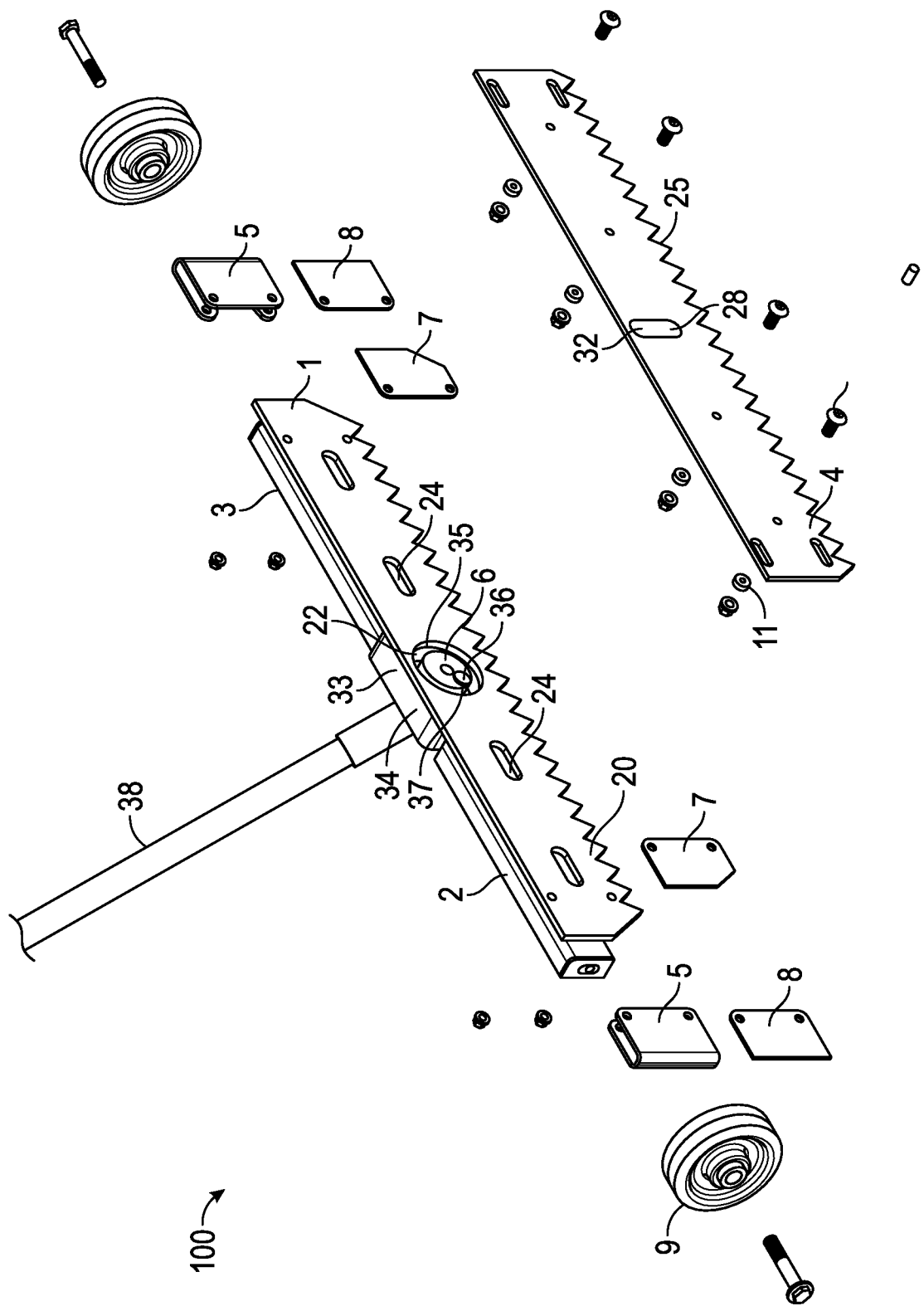
FIG. 5 shows an exploded view of the motorized lute according to the first illustrated embodiment.

FIG. 5 shows an exploded view of the motorized lute (100). The motorized lute comprises a second plate (4) slidably coupled to a first plate (1). The first plate comprises a first plurality of teeth (20) and the second plate comprises a second plurality of teeth (25). The second plate is configured to oscillate in a lateral direction with respect to the first plate. Oscillation is caused by a drive gear (6) of a motor assembly (33). The drive gear includes an output shaft (36) configured to apply a lateral force on the second plate. The drive gear comprises a drive gear diameter (35) and the output shaft comprises an output shaft diameter (37). In some embodiments, the drive gear diameter is greater than twice the output shaft diameter to accommodate for a central shaft of the drive gear while keeping the output shaft within a periphery of the drive gear.

The first plate (1) comprises a first plate aperture (22) having a first aperture diameter large enough to allow the output shaft (36) to extend through the first plate and contact an oblong opening (28) of the second plate (4). The oblong opening extends vertically which allows the output shaft undergoing a rotating motion to apply only a horizontal force on the oblong opening without any vertical force. The oblong opening may further comprise an extended perimeter (28) surrounding the oblong opening to provide better contact with the output shaft and improve durability.

The second plate (4) slidably couples to the first plate (1) with a plurality of fasteners including one or more ball bearings (11). The plurality of fasteners may include screws, washers, and locknuts. The one or more ball bearings engages with a plurality of slots (24) disposed on the first plate which provides a smooth motion of the second plurality of teeth (25).

The motorized lute (100) further comprises a side bracket (5) disposed on each side of both the first plate (1) and the second plate (4). A first shim (7) and a second shim (8) can additionally be included with each side bracket. In one embodiment, the first shim is disposed between the first plate and the second plate. The second shim is disposed between the second plate and an inner facing of the side bracket.

A motor housing (34) surrounds the motor assembly (33) and is coupled to the first plate (1) on a side opposite the second plate (4). A first wheel bracket (2) and a second wheel bracket (3) are additionally coupled to the first plate on either side of the motor housing. A wheel (9) is coupled to each of the first wheel bracket and second wheel bracket with a lute pole (38) extending from the motor housing.

Figure 6A:
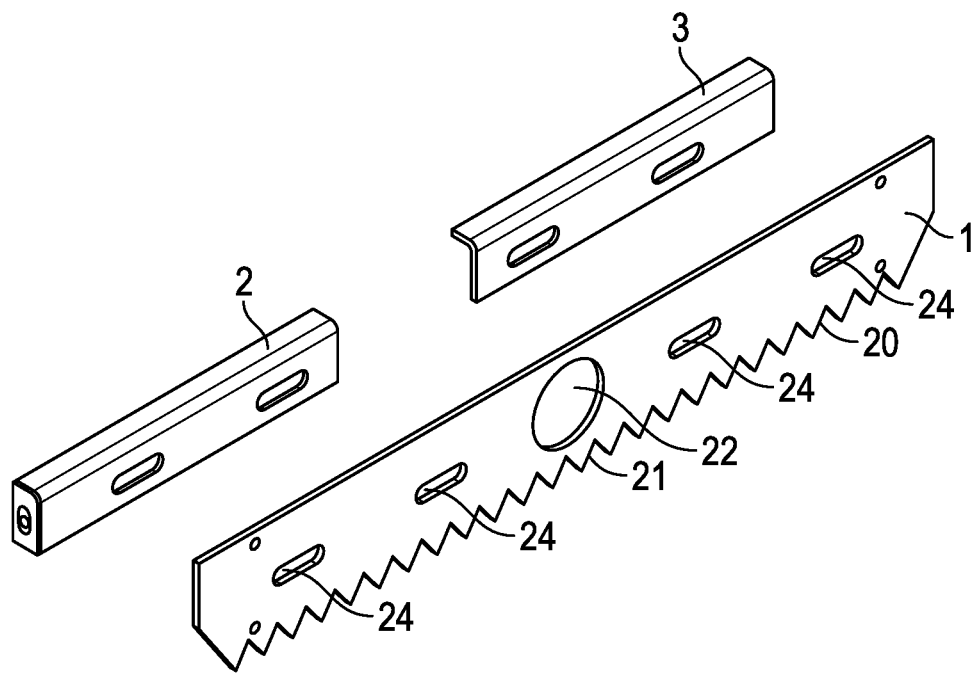
FIG. 6A shows a perspective view of a first plate of the motorized lute according to the first illustrated embodiment.
Figure 6B:
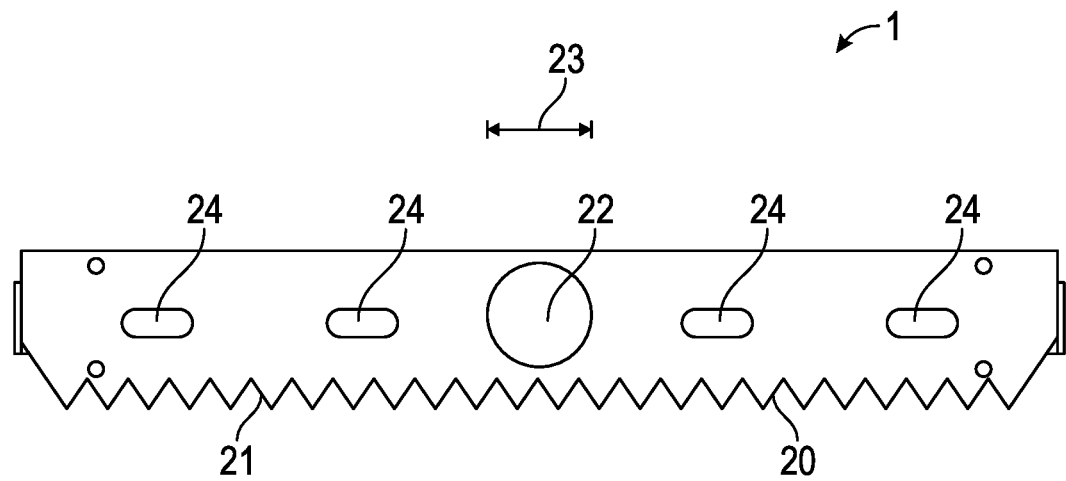
FIG. 6B a front view of the first plate according to the first illustrated embodiment.

FIGS. 6A and 6B show a first plate (1) of the motorized lute. The first plate comprises a first plurality of teeth (20) disposed on a first bottom side (21) of the first plate. Disposed at a center of the first plate is a first plate aperture (22) configured to provide clearance to a drive gear (FIG. 5, 6) and/or an output shaft (FIG. 5, 36). The first plate further comprises a plurality of slots (24) disposed on either side of the first plate aperture. The plurality of slots provides guidance for a second plate (FIG. 5, 4) during lateral oscillation. The first plate aperture has a first aperture diameter (23) which in some embodiments is greater than a drive gear diameter of the drive gear to allow for clearance of the drive gear. A first wheel bracket (2) and second wheel bracket (3) are shown configured to couple to the first plate. The first wheel bracket and the second wheel bracket may further comprise corresponding slots to align with the plurality of slots of the first plate.

Figure 7A:
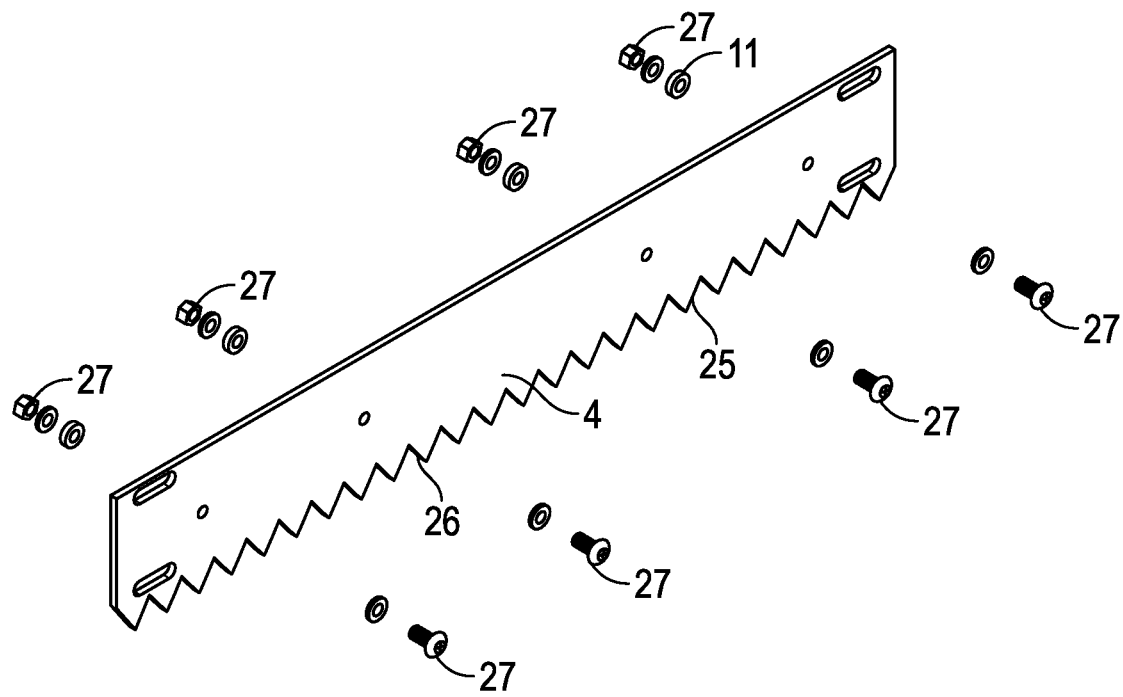
FIG. 7A shows a perspective view of a second plate of the motorized lute according to the first illustrated embodiment.
Figure 7B:
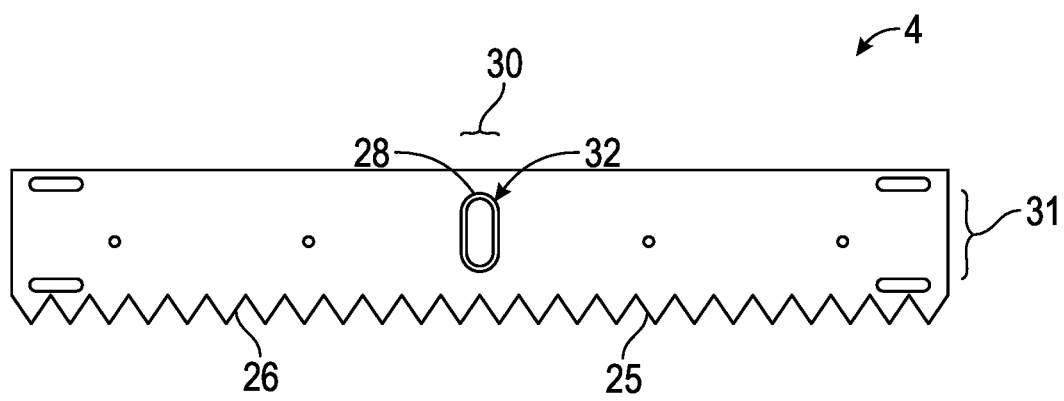
FIG. 7B shows a front view of the second plate according to the first illustrated embodiment.

FIGS. 7A and 7B show a second plate (4) of the motorized lute. The second plate comprises a second plurality of teeth (25) disposed at a second bottom side (26) of the second plate. Disposed at a center of the second plate is an oblong opening (28) having an opening width (30) and an opening height (31). The oblong opening is configured to contact an output shaft of a motor assembly wherein the output shaft moves in a circular path caused by a drive gear. The oblong height is greater than the oblong width which allows the output to provide a horizontal force with no vertical force. In some embodiments, the opening height is equal to or greater than a drive gear diameter of the drive gear to ensure no vertical force is applied to the second plate. In some embodiments, the opening height is greater than twice the opening width due to relation of the drive gear and the output shaft. The opening width is configured to surround the output shaft with little to no space therebetween to ensure a fluid movement of the second plate.

Figure 8:
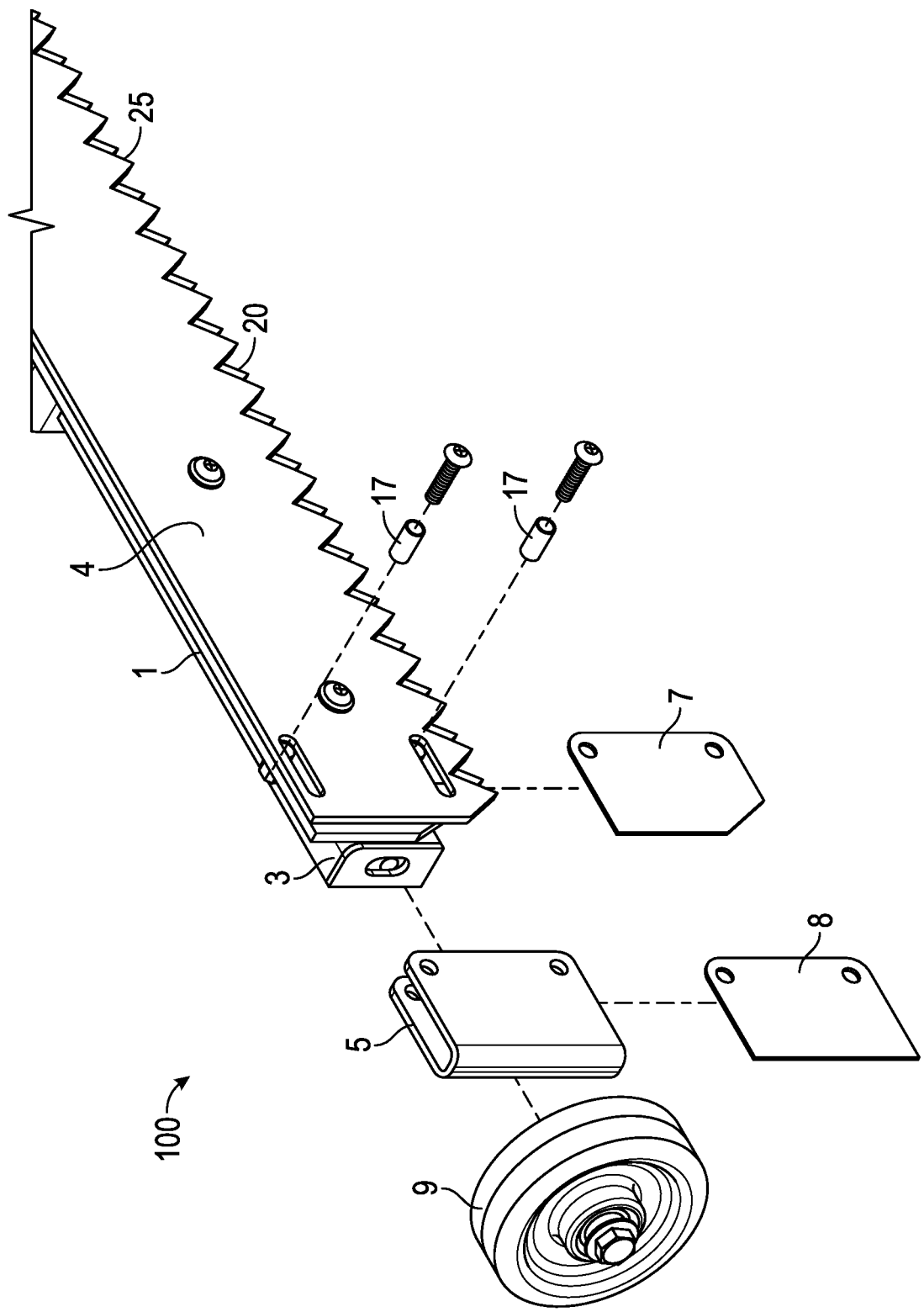
FIG. 8 shows a close-up exploded view of the motorized illustrated embodiment.

FIG. 8 shows a close-up exploded view of the motorized lute (100). The motorized lute comprises a static first plate (1) and an oscillating second plate (4) with a gap disposed between to minimize friction. Said gap can be achieve with a first shim (7) disposed between the first and second plates. A side bracket (5) is coupled to the first plate and second plate with a second shim (8) disposed between the side bracket and the second plate. A second wheel bracket (3) is coupled to the first plate such that the first plate is positioned between the second wheel bracket and the second plate. The second wheel bracket couples to a wheel (9). The first plate comprises a first plurality of teeth (20) and the second plate comprises a second plurality of teeth (25). As shown, due to lateral oscillation of the second plate, the second plurality of teeth is staggered relative to the first plurality of teeth. One having skill in the art will appreciate this illustrates one of a plurality of positions of the second plate and staggering between the first and second plurality of teeth. Hardware including spacers (17) are used to couple the second plate to the first plate. In some embodiments, a length of the spacer is longer than an overall assembled thickness to ensure friction is reduced when the assembly is tightened.

Each of the components of the motorized lute described herein may be manufactured and/or assembled in accordance with the conventional knowledge and level of a person having skill in the art.

The motor assembly may comprise a gas motor or an electric motor with power source components included. The power source components may be a battery source, electrical plug, or a gas container.

The ball bearings can be obtained commercially, for example and without limitation Permanently Lubricated Ball Bearings 2342K163 (https://www.mcmaster.com/catalog-128% 2f1311/). Alternatively, the ball bearings can be customized in accordance with the level and knowledge of one having skill in the art.

Generally, the first plate and second plate are made of durable metal such as aluminum. Otherwise, the first and second plates can be fabricated in accordance with the level and knowledge of one having skill in the art. The first and second plates can be optionally treated to prevent corrosion from the environment.

The wheels can be obtained commercially, for example and without limitation Lightweight Rubber Wheels 2439T42 (https://www.mcmaster.com/catalog-128% 2f1573/). Alternatively, the wheels can be customized in accordance with the level and knowledge of one having skill in the art.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST motorized lute (100)
first plate (1)
first wheel bracket (2)
second wheel bracket (3)
second plate (4)
side bracket (5)
drive gear (6)
first shim (7)
second shim (8)
wheel (9)
ball bearing (11)
spacer (17)
first plurality of teeth (20)
first bottom side (21)
first plate aperture (22)
first aperture diameter (23)
plurality of slots (24)
second plurality of teeth (25)
second bottom side (26)
plurality of fasteners (27)
oblong opening (28)
opening width (30)
opening height (31)
extended perimeter (32)
motor assembly (33)
motor housing (34)
drive gear diameter (35)
output shaft (36)
output shaft diameter (37)
lute pole (38)
primary handle (39)
assist handle (40)
actuator (41)

What is claimed is:

1. A motorized lute for leveling a ground surface, the motorized lute comprising:
    a first plate having a first plurality of teeth,
        the first plate further comprising a first plate aperture and a plurality of slots disposed on each side of the first plate aperture, the first plate configured to orientate orthogonally to the ground surface during operation of the motorized lute;
    a first wheel bracket and a second wheel bracket each coupled to the first plate;
    a plurality of wheels coupled to the first wheel bracket and the second wheel bracket;
    a second plate slidably coupled to the first plate, the second plate configured to orientate orthogonally to the ground surface during operation of the motorized lute, the second plate having a second plurality of teeth and an oblong opening overlapping the first plate aperture;
    one or more ball bearings engaged with the plurality of slots of the first plate;
    a motor housing coupled to the first plate and disposed between the first wheel bracket and the second wheel bracket;
    a motor assembly disposed within the motor housing, the motor assembly comprising a driver gear, and an output shaft coupled to the driver gear, wherein the output shaft extends through the first plate aperture and engages with at least a portion of the oblong opening, thereby causing horizontal oscillation of the second plate; and
    a lute pole extending from the motor housing, the lute pole including a primary handle and an actuator for controlling the motor assembly.

2. The motorized lute of claim 1, wherein the first plate is disposed between the motor housing and the second plate.

3. The motorized lute of claim 1, wherein the first plate is stationary with the motor housing.

4. The motorized lute of claim 1, wherein the first wheel bracket and the second wheel bracket are each fixedly coupled to the first plate.

5. The motorized lute of claim 1, wherein the first plate and the lute pole form an angle such that the first plate is configured align orthogonally to the ground surface during operation.

6. The motorized lute of claim 1, wherein the oblong opening is in parallel alignment with the first plate aperture.

7. The motorized lute of claim 1, wherein the oblong opening is on a same plane as the second plurality of teeth.

8. The motorized lute of claim 1, the plurality of wheels further comprising a bottommost point configured to contact the ground surface during operation, wherein the first plurality of teeth and the second plurality of teeth are configured to extend vertically below the bottommost point.

9. The motorized lute of claim 1, the plurality of slots further comprising a plurality of elongated slots wherein the one or more ball bearings are configured to slide along each of the plurality of elongated slots.

10. The motorized lute of claim 1, wherein an end of the lute pole is disposed at a center of the first plate.

11. A motorized lute for leveling a ground surface, the motorized lute comprising:
 a first plate having a first plurality of teeth, the first plate being configured to orientate orthogonally to the ground surface during operation of the motorized lute;
 a second plate slidably coupled to the first plate, the second plate having a second plurality of teeth, the second plate being configured to orientate orthogonally to the ground surface during operation of the motorized lute;
 a motor assembly configured to engage with the second plate and cause horizontal oscillation of the second plate; the first plate further comprising a first plate aperture, the motor assembly further comprising a driver gear and an output shaft coupled to the driver gear, the output shaft configured to extend through the first plate aperture;
 a plurality of wheels coupled to the first plate; and
 a lute pole coupled to the first plate.

12. The motorized lute of claim 11, the second plate further comprising an oblong opening wherein the oblong opening is in parallel alignment with the first plate aperture.

13. The motorized lute of claim 12, wherein the output shaft engages with at least a portion of the oblong opening.

14. The motorized lute of claim 12, wherein the oblong opening is on a same plane as the second plurality of teeth.

15. The motorized lute of claim 11, wherein the first plate is disposed between the motor assembly and the second plate.

16. The motorized lute of claim 11, wherein the first plate and the lute pole form an angle such that the first plate is configured align orthogonally to the ground surface during operation.

17. The motorized lute of claim 11, the plurality of wheels further comprising a bottommost point configured to contact the ground surface during operation, wherein the first plurality of teeth and the second plurality of teeth are configured to extend vertically below the bottommost point.

18. The motorized lute of claim 11, further comprising a plurality of elongated slots wherein one or more ball bearings are configured to slide along each of the plurality of elongated slots.

19. The motorized lute of claim 11, wherein an end of the lute pole is disposed at a center of the first plate.

\* \* \* \* \*